United States Patent [19]

Morokawa et al.

[11] 4,015,419
[45] Apr. 5, 1977

[54] ELECTRONIC TIMEPIECE

[75] Inventors: Shigeru Morokawa, Tokorozawa; Yukio Hashimoto, Niiza, both of Japan

[73] Assignee: Citizen Watch Co., Ltd., Tokyo, Japan

[22] Filed: Feb. 13, 1976

[21] Appl. No.: 658,037

Related U.S. Application Data

[63] Continuation-in-part of Ser. No. 628,150, Nov. 3, 1975, which is a continuation of Ser. No. 401,118, Sept. 26, 1973, Pat. No. 3,916,612.

[30] Foreign Application Priority Data

Oct. 2, 1972    Japan ........................ 47-098766
May 21, 1973    Japan ........................ 48-056444

[52] U.S. Cl. .................. 58/23 R; 58/85.5
[51] Int. Cl.² ............................. G04C 3/00
[58] Field of Search ............ 58/23 R, 85.5, 28 R, 58/4 A, 50 R, 23 A, 23 AC

[56] References Cited

UNITED STATES PATENTS

| | | | |
|---|---|---|---|
| 3,757,510 | 9/1973 | Dill | 58/50 R |
| 3,777,471 | 12/1973 | Koehler et al. | 58/23 R |
| 3,834,152 | 9/1974 | Nishimura et al. | 58/23 R |
| 3,895,486 | 7/1975 | Hammer et al. | 58/23 R |

*Primary Examiner*—Ulysses Weldon
*Attorney, Agent, or Firm*—Ernest G. Montague; Karl F. Ross; Herbert Dubno

[57] ABSTRACT

To facilitate acceleration or deceleration of the stepping rate of a time-keeping counter responding to driving pulses from a frequency divider connected to a crystal-controlled oscillator, a succession of such driving pulses is taken from an OR gate with inputs receiving a basic pulse train $\phi\gamma$ a normally present first ancillary pulse train $\phi\beta$ spacedly interleaved with pulse train $\phi\gamma$ and a normally absent second ancillary pulse train $\phi\alpha$ with pulse positions offset from those of the other two pulse trains. To retard the timepiece, the pulses of train $\phi\beta$ are blocked for a desired period; to advance it, pulses of train $\phi\alpha$ are interpolated at a rate depending on the cadence of a series of control pulses selectively synthesized from a combination of low-frequency stage outputs of the frequency divider. Externally set selection signals are temporarily stored in a memory circuit including NOR gates with positive-feedback connections to inverting inputs thereof, the memory circuit being periodically tested by a resetting pulse recurring at a frequency lower than that of the driving pulses.

10 Claims, 6 Drawing Figures

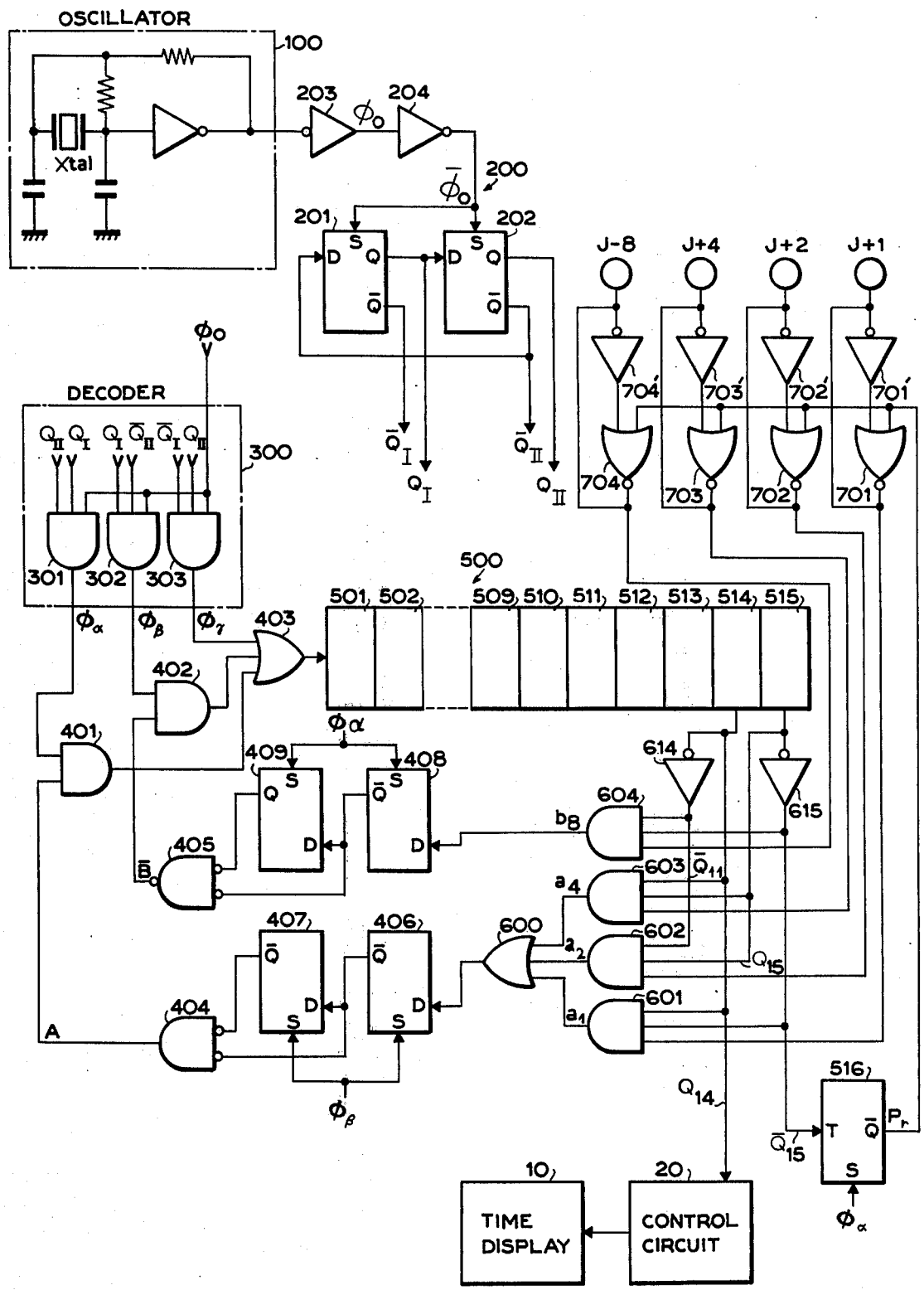
F I G . 1

ELECTRONIC TIMEPIECE

CROSS-REFERENCE TO RELATED APPLICATIONS

This is a continuation-in-part of our copending application Ser. No. 628,150 filed Nov. 3, 1975 as a continuation of our application Ser. No. 401,118 filed Sept. 26, 1973, now U.S. Pat. No. 3,916,612.

FIELD OF THE INVENTION

Our present invention relates to an electronic timepiece wherein a time-indicating display unit is driven by means such as a stepping motor responsive to a pulse sequence of relatively low frequency derived with the aid of a binary frequency divider from a primary pulse source, such as a crystal-controlled oscillator, serving as a high-frequency standard.

BACKGROUND OF THE INVENTION

In order to increase or reduce the stepping rate of such a timepiece, it has heretofore been the practice to change a parameter in the oscillator circuit which determines its resonant frequency, e.g., by adjusting a variable capacitor. This expedient, however, does not assure a stable long-term correction since the capacitances of variable condensers are subject to drift.

In our U.S. Pat. No. 3,916,612 referred to above, we have disclosed and claimed a circuit arrangement for varying the stepping rate of the pulse-responsive drive means by selectively feeding back pulses from one or more lower-frequency stage outputs of the frequency divider to its input via an anticoincidence gate, specifically a gate of the Exclusive-OR (XOR) type, inserted between the oscillator and the divider input.

OBJECT OF THE INVENTION

The object of our present invention is to provide another solution for the problem of precisely adjusting the stepping rate of such an electronic timepiece for limited or indefinite periods.

SUMMARY OF THE INVENTION

In accordance with our present invention, a succession of high-frequency driving pulses for the input of the frequency divider is obtained, with the aid of logical summing means, from a plurality of pulse trains with spacedly interleaved pulse positions which are derived from a constant-frequency pulse generator, namely the aforementioned crystal-controlled oscillator, with the aid of logical circuitry including for example a pair of cross-connected flip-flops. These pulse trains are a basic train $\Phi_\gamma$ and at least ane ancillary train adapted to be selectively passed to the summing means or suppressed; in the preferred embodiment described hereinafter, two such ancillary pulse trains are generated, namely a normally present first pulse train $\phi_\beta$ and a normally absent second pulse train $\phi_\alpha$. Thus, the first ancillary pulse train $\phi_\beta$ may issue from a normally open first gate, upstream of the summing means, to which a blocking signal can be selectively applied so as to reduce the mean pulse cadence in the divider output, thereby retarding the stepping rate of the timepiece; conversely, a normally closed second gate upstream of the summing means may be opened by an unblocking signal to give passage to the second ancillary pulse train $\phi_\alpha$ at selected instants with resulting increase in the mean pulse cadence and corresponding acceleration of the stepping rate.

Pursuant to a further feature of our invention, the blocking and unblocking signals are chopped into respective series of gating pulses under the control the pulses obtained from a section of the frequency divider, each of these series of gating pulses thus having a cadence which is less than that of the basic pulse train $\phi_\gamma$ but greater than that of the low-frequency sequence of stepping pulses appearing in the divider output.

Advantageously, a control circuit supplying the blocking and unblocking signals in response to respective selection signals, which may be manually generated, has a plurality of branches connectable to selected combinations of divider stages for establishing different pulse rates for at least one of the two series of gating pulses, preferably the series forming part of the unblocking signals for the gate of the second ancillary pulse train $\phi_\alpha$. Depending on the selection signal or signals present, different sets of gating pulses of differend width and spacing may be produced as part of that series, the pulses of these sets being relatively offset to enable their synthesis in the series with formation of gaps which may each coincide with a multiplicity of pulses from the other series. In this way, with suitable choice of the pulse rates, combinations of pulses $\phi_\alpha$ and/or $\phi_\beta$ may be used to provide a variety of positive or negative increments in the stepping rate.

According to a further feature of our invention, the selection signals are temporarily stored in respective memory networks serving the several branches of the control circuit, these networks being connected to a source of periodically generated resetting pulses whose cadence is less than that of the sequence of stepping pulses and which may be derived from a flip-flop in cascade with the frequency divider. More particularly, each temporary-storage memory network may comprise a positive-feedback circuit such as a NOR gate with an inverting input energizable by a respective selective signal, a noninverting input tied to the source of resetting pulses, and an output connected in a feedback circuit to the inverting input.

BRIEF DESCRIPTION OF THE DRAWING

The above and other features of our invention will now be described in detail with reference to the accompanying drawing in which:

FIG. 1 is an overall circuit diagram of an electronic timepiece embodying our invention;

SPECIFIC DESCRIPTION

Figure 2:
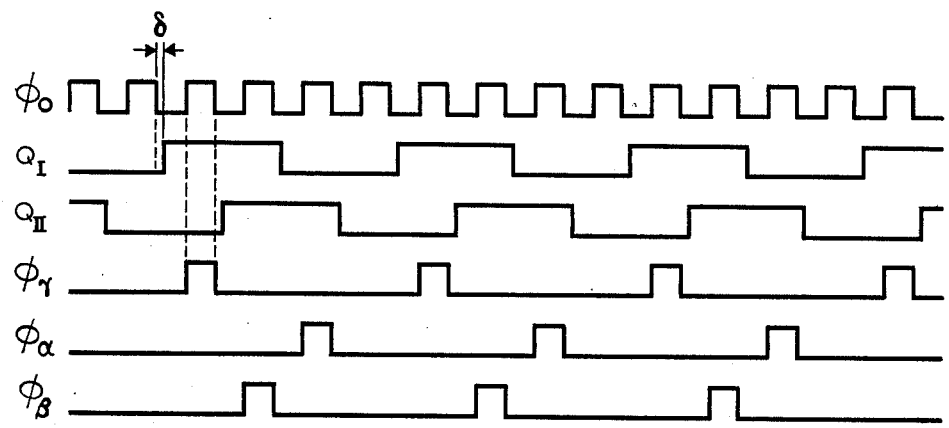
FIGS. 2 – 4 are sets of graphs showing waveforms of pulse trains appearing in the system of FIG. 1.

In FIG. 1 we show a pulse-train synthesizer for an electronic timepiece according to our invention, that timepiece including a display unit 10 with the usual digital indicators and a control circuit 20 which may comprise a stepping motor as illustrated in our U.S. Pat. No. 3,916,612. This control circuit is driven by stepping pulses in the output $Q_{14}$ of the 14th stage of a frequency divider 500 having stages 501 – 515. Driving pulses are fed to the input of the first divider stage 501, via an OR gate 403, from a decoder 300 which is energized from a crystal-controlled oscillator 100 by way of a logic circuit 200 including two cascaded flip-flops 201 and 202 each with a data input D, a set output Q, a reset output $\overline{Q}$ and a switching input S. Oscillator 100 works into the switching input S of flip-flops 201 and 202 by way of two inverters 203 and 204 in series, a high-frequency square wave $\phi_0$ appearing between these two inverters whereby inputs S are energized by the inverted wave $\overline{\phi_0}$. Since the effects of inverters 203 and 204 cancel each other, they can also be omitted. The cascaded flip-flops 201 and 202 are cross-connected in a closed loop so as to produce two relatively staggered output signals $Q_I$ and $Q_{II}$ together with their negations $\overline{Q_I}$ and $\overline{Q_{II}}$; the time positions of square waves $\phi_0$, $Q_I$ and $Q_{II}$ have been illustrated in FIG. 2 which shows a slight delay $\delta$, due to the inherent operating characteristics of the flip-flops, between the trailing edges of oscillation $\phi_0$ (and therefore the leading edges of its inversion $\overline{\phi_0}$) and the leading edges of the pulses of waves $Q_I$ and $Q_{II}$. These output waves $Q_I$, $Q_{II}$, $\overline{Q_I}$ and $\overline{Q_{II}}$ are combined with input wave $\phi_0$, within decoder 300, in three AND gates 301, 302 and 303 each provided with three inputs, signal $\phi_0$ being fed in parallel to all three gates. Gate 301 receives the signals $Q_I$ and $Q_{II}$ to produce an ancillary pulse train $\phi\alpha$. Gate 302 produces another ancillary pulse train $\phi\beta$ in response to input signals $Q_I$ and $\overline{Q_{II}}$. Gate 303, finally, is supplied the signals $\overline{Q_I}$ and $Q_{II}$ in order to give rise to a basic pulse train $\phi\gamma$.

As shown in FIG. 2, the three pulse trains $\phi\alpha$, $\phi\beta$ and $\phi\gamma$ have identical cadences or repetition frequencies and a duty ratio of less than 25% which allows them to be spacedly interleaved, by virtue of the relative offset of their pulse positions. Thus, pulses $\phi\beta$ alternate symmetrically with pulses $\phi\gamma$ whereas pulses $\phi\alpha$ fit into the spaces between pulses $\phi\beta$ and $\phi\gamma$. They can, accordingly, be individually detected in the output of a simple logical summing circuit such as an OR gate; alternatively, that circuit may comprise a NOR gate, a XOR gate or an inverting gate of the latter type.

In four successive cycles of square wave $\phi_0$, therefore, a pulse $\phi\beta$ will occur during the first cycle, a pulse $\phi\alpha$ will come into existence in the second cycle and a pulse $\phi\gamma$ will be present in the third cycle, none of these pulses existing in the fourth cycle. This relative staggering of the three pulse trains has been illustrated in the three bottom graphs of FIG. 2 and in the three top graphs of FIG. 4.

Pulses $\phi\gamma$ are fed directly to the OR gate 403 in the input of divider 500, this OR gate constituting the aforementioned summing circuit. Two other inputs of gate 403 are connected to the outputs of gates 301 and 302 by way of respective AND gates 401 and 402 having second inputs energizable by a NOR gate 404 (shown as an AND gate with two inverting inputs) and an OR gate 405 (also shown as such an AND gate, but with an inverting output), respectively. Gate 404, normally emitting a blocking signal $A=0$ for gate 401, has its inputs connected to respective reset outputs $\overline{Q}$ of two cascaded flips-flops 406, 407 whose switching inputs S are energized in parallel by the ancillary pulse train $\phi\beta$ from gate 302. Similarly, gate 405 has its inputs tied to outputs $\overline{Q}$ of two cascaded flip-flops 408, 409 with switching inputs receiving the pulses $\phi\alpha$ from gate 301; the normal output of gate 405 is an unblocking signal $\overline{B} = 1$ for gate 402.

Figure 4:
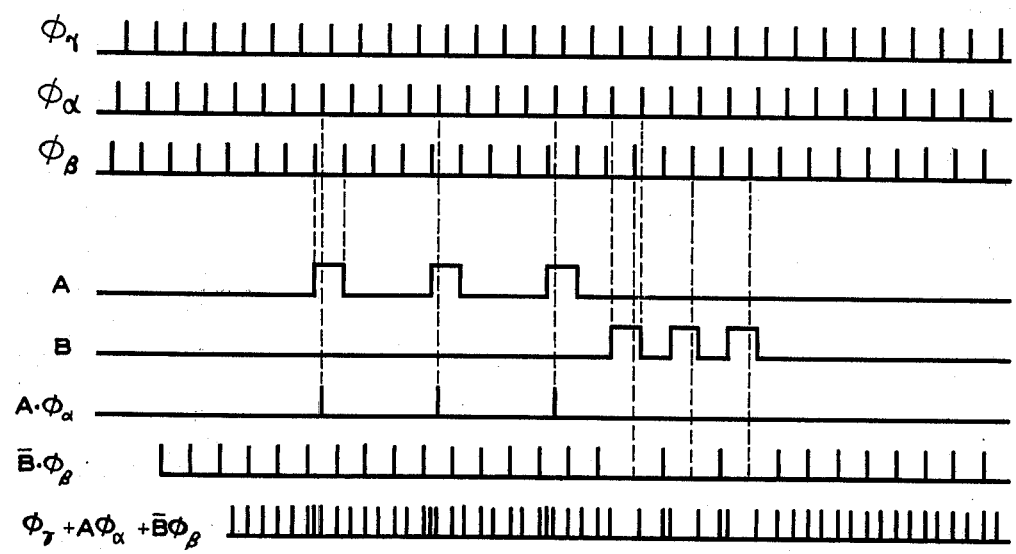
Figure 3:
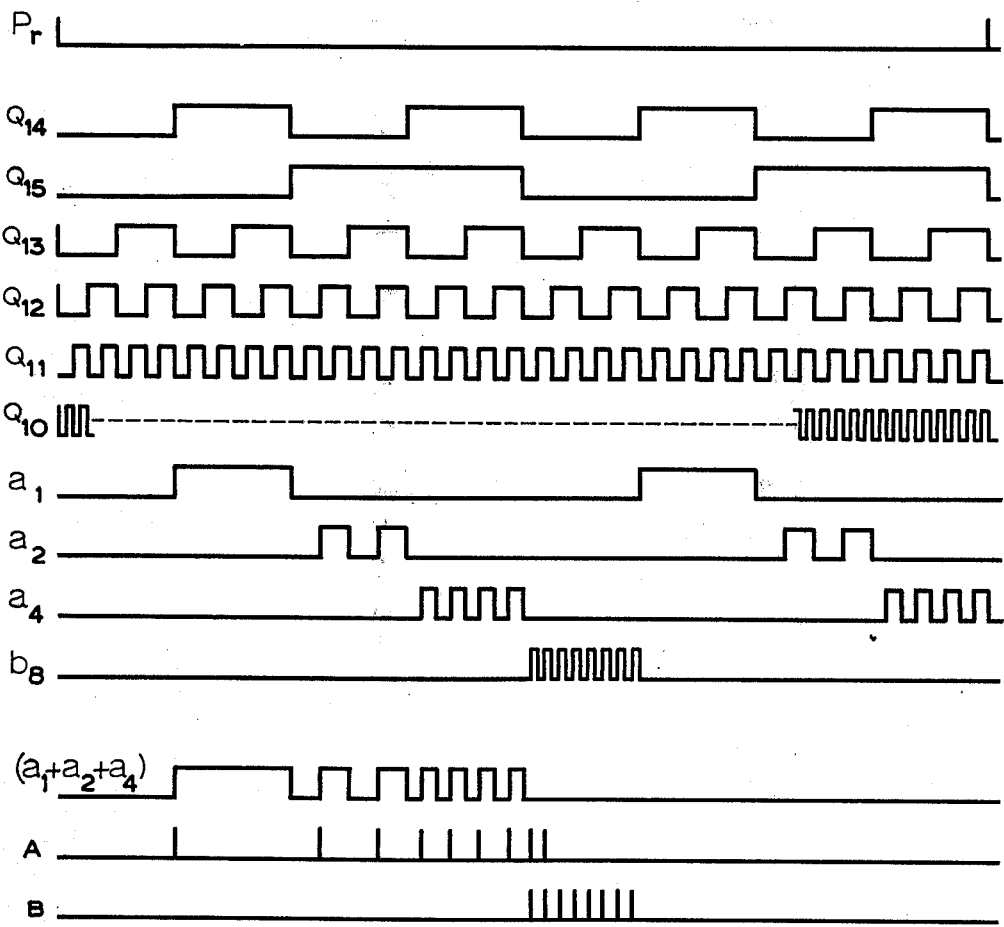

The data input D of flip-flop 406 is connected to the output of an OR gate 600 through which it can receive sets of pulses $a_1$, and $a_2$ and $a_4$ from respective AND gates 601, 602 and 603; the corresponding input of flip-flop 409 may be energized by pulses $b_8$ from another AND gate 604. Each of gates 601 – 604 has three inputs, one of them being tied to the output of a respective NOR gate 701, 702, 703, 704 for receiving a selection signal generated on a terminal J+1, J+2, J+4 or J−8 by means as described and illustrated in our U.S. Pat. No. 3,916,612; the other two outputs of gates 601 – 604 are connected in different combinations to the outputs of divider stages 514 and 515, either directly or via respective inverters 614 and 615. FIG. 3 shows the respective output waves $Q_{10} - Q_{15}$ of binary inverter stages 510 – 515; wave $Q_{14}$, also delivered to control circuit 20 as mentioned above, is fed directly to gates 601, 603 and invertedly (as a wave $\overline{Q_{14}}$) to gates 602, 604 whereas wave $Q_{15}$ is fed directly to gates 602, 603 and invertedly (as a wave $\overline{Q_{15}}$) to gates 601, 604. Inverted wave $\overline{Q_{15}}$ also steps a flip-flop 516 in cascade with divider 500, the switching input S of this flip-flop receiving the pulse train $\phi\alpha$ from gate 301. Flip-flop 516 thus emits, during every other cycle of wave $Q_{15}$, a resetting pulse $P_r$ applied to one input of each NOR gate 701 – 704. The other inputs of these NOR gates are connected to terminals J+1, J+2, J+4 and J−8 via respective inverters 701', 702', 703', 704' and may therefore be regarded as inverting inputs. A feedback circuit extends from the output of each NOR gate to its inverting input, i.e., to the corresponding inverter 701' – 704', so as to store for a limited additional interval a selection signal appearing for a desired period on the corresponding input terminal J+1, etc. Thus, voltage on terminal J+1 de-energizes the left-hand input or NOR gate 701 which, in the absence of a resetting pulse $P_r$ from flip-flop 516, has an output fed back to inverter 701' even after the selection signal on terminal J+1 has disappeared. The next resetting pulse $P_r$ cancels the output signal of NOR gate 701 if terminal J+1 is no longer energized. Since the resetting pulse $P_r$ is triggered by a pulse $\phi\alpha$, it occurs shortly after every other descending flank of wave $Q_{15}$ as seen in FIG. 3. That Figure also shows the staggered time positions and progressively decreasing relative widths of pulses $a_1$, $a_2$, $a_4$ and $b_8$ issuing from gates 601, 602, 603 and 604 in the presence of respective selection signals. Thus, the three accelerating pulse sets $a_1$, $a_2$ and $a_4$ can be combined into a series of gating pulses A, appearing in the output of gate 404, offset from a series of gating pulses B corresponding to pulses $b_8$ and appearing as voltage interruptions in the output of gate 405 in lieu of the unblocking signal $\overline{B}$ normally present there. Thus, the gate 402 is intermittently blocked by the pulses B representing a chopped gating signal; conversely, the pulses A constitute a chopped gating signal opening the normally closed gate 401 to the passage of pulses $\phi\alpha$. In the outputs of gates 401 and 402 there will therefore appear the signals $A \cdot \phi\alpha$ and $\overline{B} \cdot \phi\beta$, respectively, as illustrated in FIG. 4.

As will be apparent from FIG. 3, gating pulses A and B are narrow spikes coinciding with the leading edges of their generating pulses $a_1$, $a_2$, $a_4$ and $b_8$. This results from the differentiating action of the two pairs of flip-flops 406, 407 and 408, 409 which are triggered by pulses $\phi\beta$ and $\phi\alpha$, respectively. Whenever the data input (D) of the first-stage flip-flop 406 is energized by voltage from the associated supply gate 600, the next trigger pulse $\phi_\beta$ switches that flip-flop to its set state with consequent de-energization of its reset output ($\overline{Q}$) leading to one of the inverting inputs of gate 404. Since the second-stage flip-flop 407 is normally set, its reset output is de-energized so that a pulse A appears in the output of gate 404 and energizes one of the inputs of AND gate 401. The circuit remains in this condition until the occurrence of the next trigger pulse $\phi_\beta$, i.e., for a short interval during which a pulse $\phi_\alpha$ is applied to the other input of AND gate 401 with consequent transmission of an accelerating pulse $A \cdot \phi_\alpha$ to summing gate 403. The next trigger pulse $\phi_\beta$ resets the flip-flop 407 whereupon NOR gate 404 no longer conducts for as long as flip-flop 406 remains set by a signal in its data input. In an analogous manner, OR gate 405 is cut off during a brief interval bridging the occurrences of the first two trigger pulses $\phi_\alpha$ upon energization of the data input (D) of the first-stage flip-flop 408 by a generating pulse $b_8$ from gate 604; this prevents the passage of the next pulse $\phi_\beta$, occurring during that brief interval, through gate 402 to gate 403.

As further seen in FIG. 3, all the generating pulses $a_1$, $a_2$, $a_4$ and $b_8$ occur in mutually staggered relationship within one cycle of square wave $Q_{15}$ corresponding to half a recurrence period of resetting pulses $P_r$. This insures that the generation of a series of gating pulses, once initiated by the manual energization of one or more selection terminals J+1, etc., is carried to completion.

Since terminals J+1, J+2 and J+4 can be energized in seven possible combinations, the number of accelerating driving pulses $\phi_\alpha$ fed into the input of frequency divider 500 during a single cycle of wave $Q_{15}$ can be varied between 1 and 7. While only one terminal J-8 is available for deceleration, with cancellation of eight driving pulses $\phi_\beta$ per cycle, it will be apparent that the number of such cancellations can be varied between 1 and 8 by simultaneously energizing the terminal J-8 and one or more of the other three terminals.

Figure 6:
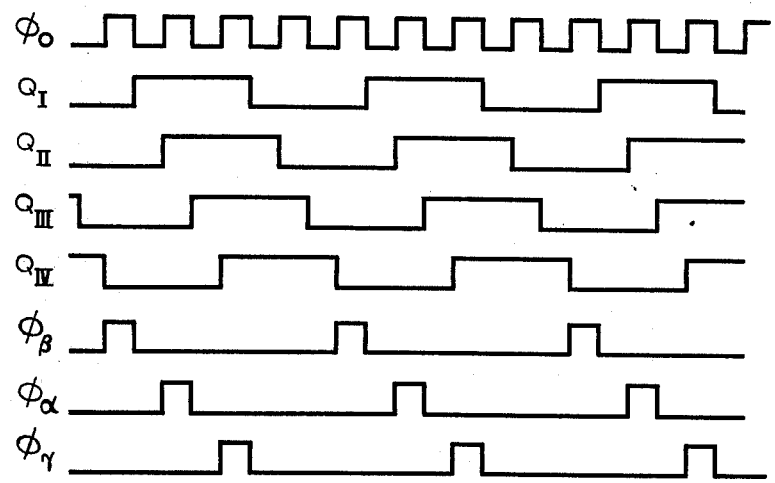
FIG. 6 is a further set of graphs relating to the circuit of FIG. 5.
Figure 5:
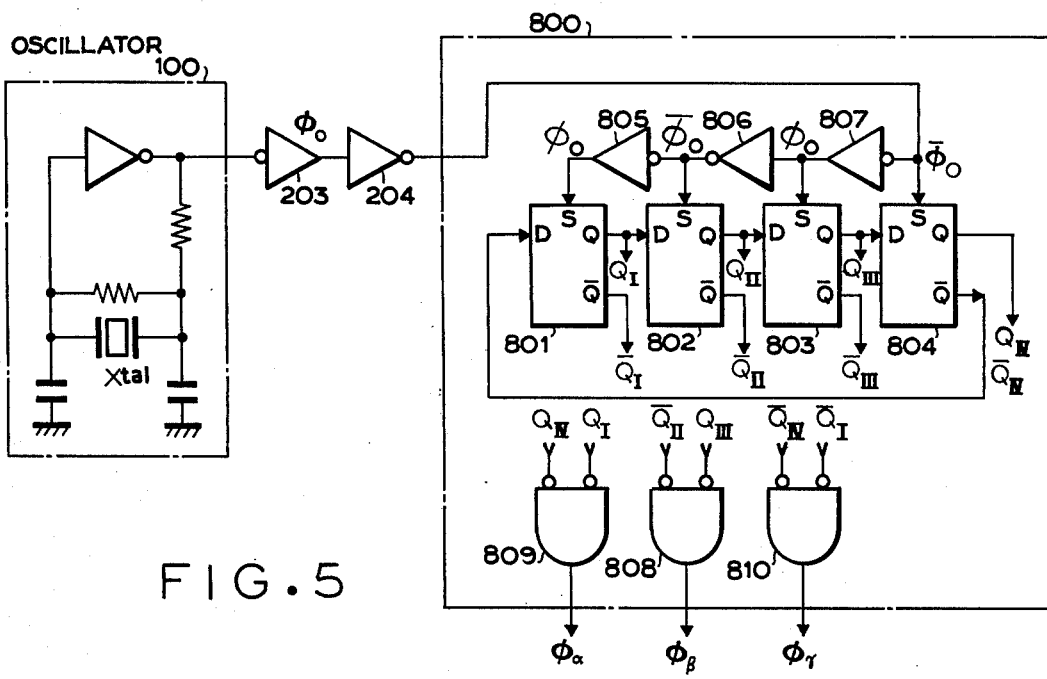
FIG. 5 is a circuit diagram showing a partial modification of the system of FIG. 1.

In FIG. 5 we have shown an alternate circuit arrangement for deriving the pulse trains $\phi_\alpha$, $\phi_\beta$ and $\phi_\gamma$ from the crystal-controlled oscillator 100 in whose output, again, two cascaded inverters 203, 204 have been illustrated. The oscillator here works into a logic circuit 800 with four cascaded flip-flops 801, 802, 803, 804 again interconnected in a closed loop, the switching inputs S of these flip-flops being separated by a chain of inverters 805, 806, 807 whereby flip-flops 801 and 803 receive the square wave $\phi_0$ whereas flip-flops 802 and 804 receive the inverted wave $\overline{\phi_0}$. Output signals $Q_I - Q_{IV}$ of these flip-flops, illustrated in FIG. 6, and their inversions $\overline{Q_I} - \overline{Q_{IV}}$ are fed in combinations $\overline{Q_{II}}Q_{III}$, $Q_IQ_{IV}$ and $\overline{Q_IQ_{IV}}$ to three NOR gates 808, 809, 810 emitting the pulse trains $\phi_\alpha$, $\phi_\beta$, $\phi_\gamma$, respectively. Circuit 800 may thus be substituted for the combination of circuits 200 and 300 in the synthesizer of FIG. 1.

The logic networks shown in FIGS. 1 and 5 can be incorporated in integrated circuitry of the C/MOS type, thus providing a highly compact assembly with minimum current consumption.

We claim:

1. An electronic timepiece comprising:
a constant-frequency pulse generator;
circuit means connected to said generator for deriving therefrom a basic pulse train and at least one ancillary pulse train, said pulse trains having spacedly interleaved pulse positions;
a multistage frequency divider with high-frequency input means and low-frequency output means;
logical summing means connected to said circuit means for additively combining said pulse trains into a succession of driving pulses fed to said input means;
pulse-responsive means connected to said output means for receiving therefrom a low-frequency pulse sequence stepped down from said succession of driving pulses;
time-indicating means connected to said pulse-responsive means for being driven by said pulse sequence; and
control means selectively operable to suppress said ancillary pulse train, thereby decelerating the drive of said time-indicating means.

2. A timepiece as defined in claim 1 wherein the pulse trains derived by said circuit means include a first ancillary pulse train and a second ancillary pulse train besides said basic pulse train, said circuit means comprising first gate means upstream of said summing means for normally passing said first ancillary pulse train and second gate means upstream of said summing means for normally blocking said second ancillary pulse train, said control means being selectively operable to supply a blocking signal to said first gate means and an unblocking signal to said second gate means.

3. A timepiece as defined in claim 2 wherein said control means is connected to a section of said frequency divider for chopping said blocking and unblocking signals into a series of first gating pulses and a series of second gating pulses, respectively, each of said series of gating pulses having a cadence less than that of said basic pulse train but greater than that of said pulse sequence.

4. A timepiece as defined in claim 3 wherein said section comprises a plurality of divider stages, said control means having a plurality of branches connectable to selected combinations of said stages for establishing different pulse rates for at least one of said series of gating pulses.

5. A timepiece as defined in claim 4 wherein said branches are responsive to several selection signals for respectively producing different sets of gating pulses of different width and spacing, the pulses of said sets being relatively offset to enable their synthesis in said one of said series.

6. A timepiece as defined in claim 5 wherein one of said branches is responsive to one of said selection signals for producing a multiplicity of pulses of the other of said series during a period coinciding with a gap between pulses of said one of said series.

7. A timepiece as defined in claim 6 wherein said one of said series of gating pulses forms part of said unblocking signal.

8. A timepiece as defined in claim 5, further comprising storage means for said selection signals and a source of resetting pulses periodically fed to said storage means at a cadence less than that of said pulse sequence, said branches being connected to said storage means.

9. A timepiece as defined in claim 8 wherein said source comprises a flip-flop in cascade with said frequency divider.

10. A timepiece as defined in claim 8 wherein said storage means comprises a plurality of memory networks, one for each of said branches, each including a NOR gate with an inverting input energizable by a respective selection signal, a noninverting input, and an output connected to said inverting input, said noninverting input being connected to said source.

* * * * *